US011201340B2

(12) United States Patent
Kwon et al.

(10) Patent No.: US 11,201,340 B2
(45) Date of Patent: Dec. 14, 2021

(54) HYDROGEN SUPPLY CONTROL SYSTEM AND CONTROL METHOD FOR FUEL CELL

(71) Applicants: Hyundai Motor Company, Seoul (KR); Kia Motors Corporation, Seoul (KR)

(72) Inventors: Soon Woo Kwon, Gyeonggi-do (KR); Joon Yong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 98 days.

(21) Appl. No.: 16/365,247

(22) Filed: Mar. 26, 2019

(65) Prior Publication Data
US 2020/0144642 A1    May 7, 2020

(30) Foreign Application Priority Data
Nov. 1, 2018    (KR) .......................... 10-2018-0132992

(51) Int. Cl.
*H01M 8/0444* (2016.01)
*H01M 8/04082* (2016.01)
*H01M 8/04746* (2016.01)
*H01M 8/04537* (2016.01)

(52) U.S. Cl.
CPC ... *H01M 8/04761* (2013.01); *H01M 8/04201* (2013.01); *H01M 8/04447* (2013.01); *H01M 8/04462* (2013.01); *H01M 8/04582* (2013.01)

(58) Field of Classification Search
CPC ......... H01M 8/04761; H01M 8/04201; H01M 8/04447; H01M 8/04462; H01M 8/04582
See application file for complete search history.

(56) References Cited

U.S. PATENT DOCUMENTS

| 2006/0003204 | A1* | 1/2006 | Callahan | H01M 8/04231 429/415 |
| 2006/0051632 | A1* | 3/2006 | Kamihara | H01M 8/04231 429/415 |
| 2010/0129688 | A1* | 5/2010 | Schmidt | H01M 8/04805 429/443 |

FOREIGN PATENT DOCUMENTS

| JP | 2004-185974 A | 7/2004 |
| JP | 2006-079891 A | 3/2006 |
| JP | 2006-221980 A | 8/2006 |
| JP | 2006-324058 A | 11/2006 |
| JP | 5155997 B2 | 3/2013 |
| JP | 5502553 B2 | 5/2014 |

(Continued)

*Primary Examiner* — Christopher P Domone
*Assistant Examiner* — Kimberly Wyluda
(74) *Attorney, Agent, or Firm* — Mintz Levin Cohn Ferris Glovsky and Popeo, P.C.; Peter F. Corless (57) ABSTRACT

A hydrogen supply control system for a fuel cell is provided. The system includes a fuel cell stack that generates electricity using supplied hydrogen and air and a recirculation line that supplies hydrogen discharged from an outlet of the fuel cell stack back to an inlet of the fuel cell stack. A purge valve is disposed at an outlet side of the fuel cell stack of the recirculation line and discharges hydrogen in the recirculation line to the outside as the outlet is opened. A recirculation determining processor determines a recirculation state of the recirculation line and a concentration estimator estimates a purge amount for each gas, which is purged by the purge valve, based on the determined recirculation state and estimates a concentration of hydrogen in the recirculation line based on the estimated purge amount for each gas.

10 Claims, 2 Drawing Sheets

(56) References Cited

FOREIGN PATENT DOCUMENTS

KR 101459815 B1 11/2014
WO 2008/032838 A1 3/2008

* cited by examiner

HYDROGEN SUPPLY CONTROL SYSTEM AND CONTROL METHOD FOR FUEL CELL

CROSS REFERENCE TO RELATED APPLICATION

The present application claims priority to Korean Patent Application No. 10-2018-0132992, filed Nov. 1, 2018, the entire contents of which is incorporated herein for all purposes by this reference.

BACKGROUND

Field of the Invention

The present invention relates to a hydrogen supply control system and a control method for a fuel cell, and more specifically, to a technique that directly estimates a concentration of hydrogen supplied to a fuel cell stack and performs purge control and hydrogen pressure control.

Description of the Related Art

A fuel cell converts chemical energy, which is derived from an oxidation and reduction reaction of hydrogen and oxygen supplied by a hydrogen supplier and an air supplier, respectively, into electrical energy. A fuel cell includes fuel cell stacks that produce electrical energy and a cooling system for cooling the fuel cell stacks.

Hydrogen is supplied to an anode side of a fuel cell, and an oxidation reaction of hydrogen occurs at the anode such that hydrogen ions (protons) and electrons are produced. The hydrogen ions and the electrons are transported to a cathode through an electrolyte membrane and a separator, respectively. The cathode produces water through an electrochemical reaction involving hydrogen ions and electrons moving from the anode and oxygen in the air, and electrical energy is generated from the electron flow. During this process, hydrogen supplied to the anode side of the fuel cell is required to be maintained at a predetermined level of concentration, whereby hydrogen purge control is achieved in the hydrogen recirculation line. The hydrogen purge control generally estimates a concentration of hydrogen in real time and conducts hydrogen purge control to thus maintain a predetermined level of a concentration of hydrogen.

Conventionally, a concentration of hydrogen on the anode side of the fuel cell stack has been unable to be estimated. Accordingly, a concentration of hydrogen on the anode side of the fuel cell stack is adjusted to be maintained by a method in which an output current of the fuel cell over time is integrated, a value of Q is defined by multiplying a weighting factor and the integrated value, and purging is performed when the Q value reaches an experimentally tuned reference value (current integration control method).

However, with this conventional purge control method, a relationship between and the Q-value and the concentration of hydrogen, which is a target to be actually controlled, is not clear. Therefore, criteria for a hydrogen target concentration or a hydrogen target pressure are not clear, and accordingly, a concentration of hydrogen is unable to be adjusted in an optimal manner. In addition, the Q value is not increased where an output current of the fuel cell is zero (e.g., in an idle stop section) and thus, purging performance may not be possible. In addition, the concentration of hydrogen of the fuel cell may not be maintained properly according to a driving situation such as driving in high speed or driving in a city (e.g., congested areas).

In particular, in a fuel cell stop (FC stop) mode or a low flow control mode, which rarely consumes hydrogen at a fuel cell, a recirculation effect of a recirculation line by an ejector of the fuel cell is relatively insignificant. Accordingly, spread by the recirculation line is achieved insufficiently and thus, an effect of purging does not fully correspond to a state in which the recirculation effect is substantial.

The foregoing is intended merely to aid in the understanding of the background of the present invention, and is not intended to mean that the present invention falls within the purview of the related art that is already known to those skilled in the art.

SUMMARY

Accordingly, the present invention provides a technique that estimates a concentration of hydrogen of an anode side of a fuel cell stack in a manner that a purge amount for each gas purged by a purge valve is reflected depending on a recirculation rate of a recirculation line and that then adjusts hydrogen supply of the fuel cell.

In order to achieve the above objective, according to the present invention, a hydrogen supply control system for a fuel cell may include: a fuel cell stack that generates electricity using supplied hydrogen and air; a recirculation line that supplies hydrogen discharged from an outlet of the fuel cell stack back to an inlet of the fuel cell stack; a purge valve disposed at an outlet side of the fuel cell stack of the recirculation line and that discharges hydrogen in the recirculation line to the outside as the outlet is opened; a recirculation determining processor configured to determine a recirculation state of the recirculation line; and a concentration estimator configured to estimate a purge amount for each gas, which is purged by the purge valve connected to the outside from the recirculation line, based on the recirculation state of the recirculation line determined by the recirculation determining processor and estimate a concentration of hydrogen in the recirculation line based on the estimated purge amount for each gas.

The system may further include: an ejector disposed at the inlet side of the fuel cell stack of the recirculation line and connected to the fuel tank to supply hydrogen in a fuel tank to the recirculation line. The recirculation determining processor may be configured to determine a recirculation state based on an output current of the fuel cell stack. The concentration estimator may then be configured to correct the concentration of nitrogen or hydrogen, which is estimated based on the assumption that the gases in the recirculation line are distributed uniformly, according to the recirculation state of the recirculation line and estimate a purge amount of nitrogen or a purge amount of hydrogen using the corrected concentration of nitrogen or hydrogen. The system may further include: a purge controller configured to adjust opening of the purge valve based on the estimated concentration of hydrogen.

Additionally, according to the present invention, a hydrogen supply control method for a fuel cell may include: determining a recirculation state of a recirculation line, which supplies hydrogen discharged from an outlet of a fuel cell stack back to an inlet of the fuel cell stack; estimating a purge amount for each gas, which is purged by a purge valve connected to the outside from the recirculation line, based on the determined recirculation state of the recirculation line; and estimating a concentration of hydrogen in the recirculation line based on the estimated purge amount for each gas.

At the determining of the recirculation state of the recirculation line, a recirculation state may be determined based on an output current of the fuel cell stack. At the determining of the recirculation state of the recirculation line, the recirculation may be determined to be activated when a state in which the output current of the fuel cell stack is equal to or greater a predetermined first current continues for a predetermined time or longer. At the determining of the recirculation state of the recirculation line, the recirculation may be determined to be inactivated when a state in which the output current of the fuel cell stack is equal to or less than a predetermined second current continues for a predetermined time or longer.

At the estimating of a purge amount for each gas, the concentration of nitrogen or hydrogen, which is estimated based on assumption that the gases in the recirculation line are distributed uniformly, may be corrected according to the recirculation state of the recirculation line. In addition, a purge amount of nitrogen or a purge amount of hydrogen may be estimated using the corrected concentration of nitrogen or hydrogen. At the estimating of a purge amount for each gas, the concentration of nitrogen estimated assuming that the gases in the recirculation line are distributed uniformly may be corrected to be reduced or to be increased in a manner that a non-uniformity factor is reflected, which is predetermined according to the recirculation state.

At the estimating of a purge amount for each gas, in response to determining that the recirculation is activated, the purge amount for each gas may be estimated using the estimated gas concentration as it is, the gas concentration being estimated assuming that the gases in the recirculation line are distributed uniformly. Additionally, at the estimating of a concentration of hydrogen in the recirculation line, a concentration of hydrogen may be estimated based on the total gas amount in the recirculation line, the amount of crossover nitrogen introduced, the amount of crossover vapor introduced, and the estimated purge amount for each gas. After the estimating of a concentration of hydrogen in the recirculation line, the method may further include: adjusting opening of the purge valve based on the estimated concentration of hydrogen.

According to the hydrogen supply control system and the control method for a fuel cell of the present invention, a concentration of gas purged by a purge valve may be estimated more accurately according to how much gas recirculates in a recirculation line. In addition, an accuracy of estimating a concentration of hydrogen in a recirculation line may be improved by reflecting a purge amount for each gas. Furthermore, the durability of the system may be secured and the fuel efficiency may be improved through an improved purge control.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions of exemplary embodiments of the present invention disclosed herein are only for illustrative purposes of the exemplary embodiments of the present invention. The present invention may be embodied in many different forms without departing from the spirit and significant characteristics of the present invention. Therefore, the exemplary embodiments of the present invention are disclosed only for illustrative purposes and should not be construed as limiting the present invention.

Reference will now be made in detail to various exemplary embodiments of the present invention, specific examples of which are illustrated in the accompanying drawings and described below, since the exemplary embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms first, second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Further, the terms used herein to describe a relationship between elements, for example, "between", "directly between", "adjacent", or "directly adjacent" should be interpreted in the same manner as those described above.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, embodiments of the present invention will be described in detail with reference to the accompanying drawings. Throughout the drawings, the same reference numerals will refer to the same or like parts.

Figure 1:
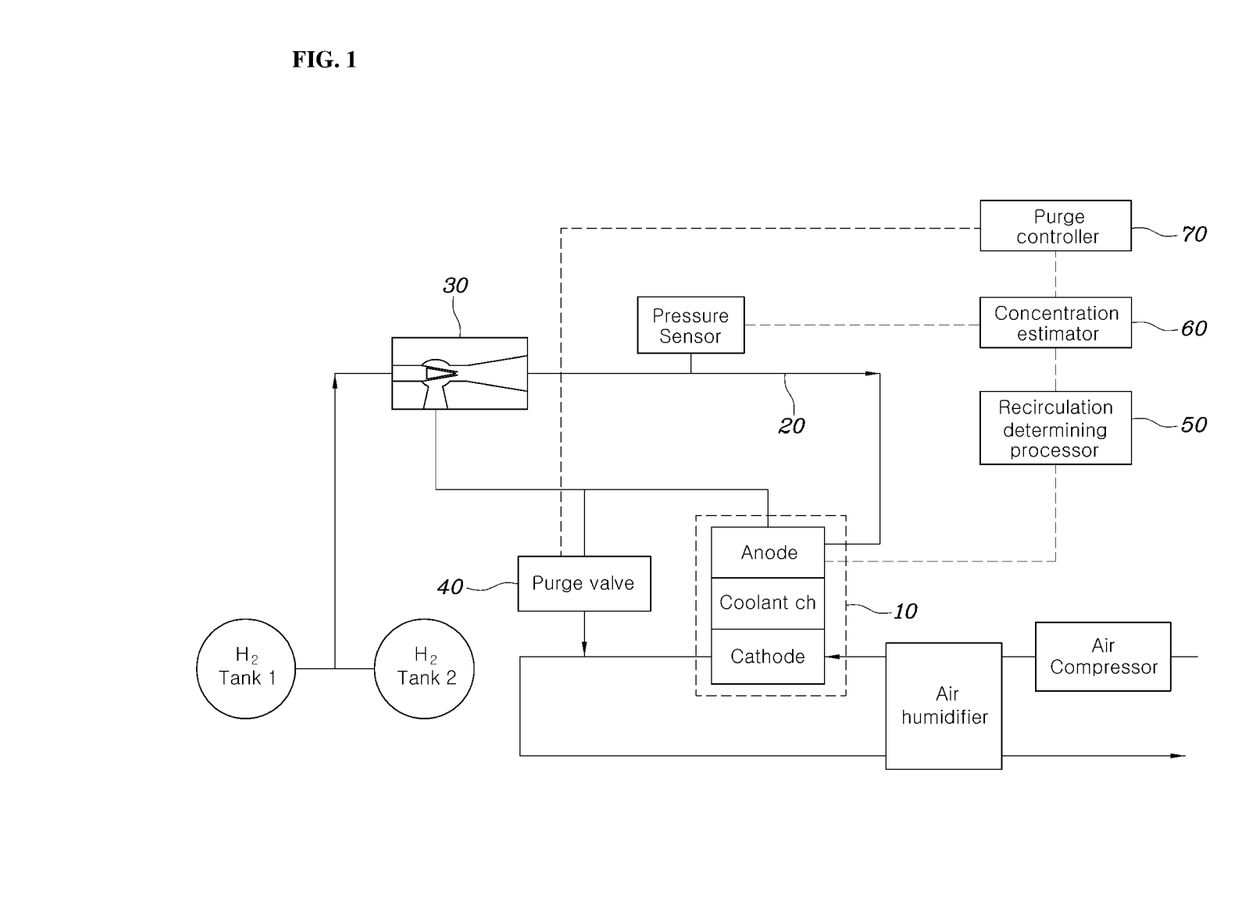
FIG. 1 is a view illustrating a configuration of a hydrogen supply control system for a fuel cell according to an exemplary embodiment of the invention.

FIG. 1 is a view illustrating a configuration of a hydrogen supply control system for a fuel cell according to an exemplary embodiment of the invention. Referring to FIG. 1, a hydrogen supply control system for a fuel cell according to an exemplary embodiment of the invention may include: a fuel cell stack 10 that generates electricity using supplied hydrogen and air; a recirculation line 20 that supplies hydrogen discharged from an outlet of the fuel cell stack 10 back to an inlet of the fuel cell stack 10; a purge valve 40 disposed at an outlet side of the fuel cell stack 10 of the recirculation line 20 and that discharges hydrogen in the recirculation line 20 to the outside as the outlet is opened; a recirculation determining processor 50 configured to determine a recirculation state of the recirculation line 20; and a concentration estimator 60 configured to estimate a purge amount for each gas, which is purged by the purge valve 40 connected to the outside from the recirculation line 20, based on the recirculation state of the recirculation line 20 determined by the recirculation determining processor 50 and estimate a concentration of hydrogen in the recirculation line 20 based on the estimated purge amount for each gas.

The fuel cell stack 10 has a membrane electrode assembly (MEA) therein and generates electricity by chemical reaction between hydrogen and oxygen in the air. The recirculation line 20 may be connected to the anode side of the fuel cell stack 10 and may supply hydrogen to the fuel cell stack 10. In particular, the recirculation line 20 may be connected to supply hydrogen discharged from the outlet of the fuel cell stack 10 back to the inlet of the fuel cell stack 10.

The purge valve 40 may be disposed at the outlet side of the fuel cell stack 10 of the recirculation line 20. Gas containing hydrogen of the recirculation line 20 may be discharged to the outside according to the purge control in which the purge valve 40 is opened. According to the purge control, gas of the recirculation line 20, which contains impurities, may be discharged to the outside and pure hydrogen may be supplied to maintain a concentration of hydrogen in the recirculation line 20.

Particularly, the recirculation determining processor 50 may be configured to determine a recirculation state of the recirculation line 20. Specifically, the recirculation determining processor 50 may be configured to determine whether gases in the recirculation line 20 maintain a uniform state while circulating rapidly or whether the gases in the recirculation line 20 are almost stationary in a non-uniform state. A non-uniform state of concentration occurs since recirculation of the recirculation line 20 rarely occurs in an engine off-stage or an FC stop mode and since an effect of impurity introduction occurs locally due to crossover of hydrogen, oxygen, and vapor through the MEA.

In addition, during purge control in which gas in the recirculation line 20 is discharged to the outside, concentrations of respective purge gases discharged through the purge valve 40 may be influenced by a recirculation state. Thus, the concentration estimator 60 may be configured to estimate a purge amount for each gas, which is purged by the purge valve 40 connected to the outside from the recirculation line 20, based on the recirculation state of the recirculation line 20 determined by the recirculation determining processor 50. In addition, the concentration estimator 60 may be configured to estimate a concentration of hydrogen in the recirculation line 20 based on the estimated purge amount for each gas.

According to the present invention, concentrations of the gases purged through the purge valve 40 may be estimated more accurately according to how much the gases recirculate in the recirculation line 20. Accordingly, an accuracy of estimating a concentration of hydrogen in the recirculation line 20 may be improved by reflecting the more accurate purge amount for each gas. In particular, a technique according to the related art which estimates a concentration of hydrogen assumes that concentrations of gases in the recirculation line 20 are the same. With this technique, a substantial error occurs between an actual concentration of hydrogen and an estimated concentration of hydrogen in a driving mode that FC stop frequently occurs during driving of a fuel cell vehicle. However, according to the present invention, an accuracy of estimation may be improved by modifying a concentration of gas purged in the recirculation line 20 in an FC stop mode or low flow control mode, thereby reducing error.

The system may further include an ejector 30 disposed at the inlet side of the fuel cell stack 10 of the recirculation line 20 and connected to the fuel tank to supply hydrogen in a fuel tank to the recirculation line 20. The ejector 30 may be disposed between the recirculation line 20 and the fuel tank. Recirculation of the recirculation line 20 occurs due to a differential pressure between the inlet side and the outlet side of the fuel cell stack 10 of the recirculation line 20 according to characteristics of the ejector 30. Therefore, during an FC stop mode or low flow control mode wherein the differential pressure between the inlet side and the outlet side of the fuel cell stack 10 is minimal, a recirculation state of the recirculation line 20 may be inactivated and backflow may occur. Thus, a recirculation state may be determined to reflect the result in an estimation for a purge amount for each gas.

The recirculation determining processor 50 may be configured to determine a recirculation state based on an output current of the fuel cell stack 10. The concentration estimator 60 may then be configured to correct the concentration of nitrogen or hydrogen, estimated based on the assumption that the gases in the recirculation line 20 are distributed uniformly, according to the recirculation state of the recirculation line 20 and estimate a purge amount of nitrogen or a purge amount of hydrogen using the corrected concentration of nitrogen or hydrogen.

The system may further include a purge controller 70 configured to adjust the opening of the purge valve 40 based on the estimated concentration of hydrogen. The purge controller 70 secures durability of the system and improves fuel efficiency through an improved purge control according to the estimation of concentration of hydrogen with improved accuracy.

Hereinbelow, a control method thereof will be described in detail. The control method described below may be executed by a controller of the system having a processor and a memory.

Figure 2:
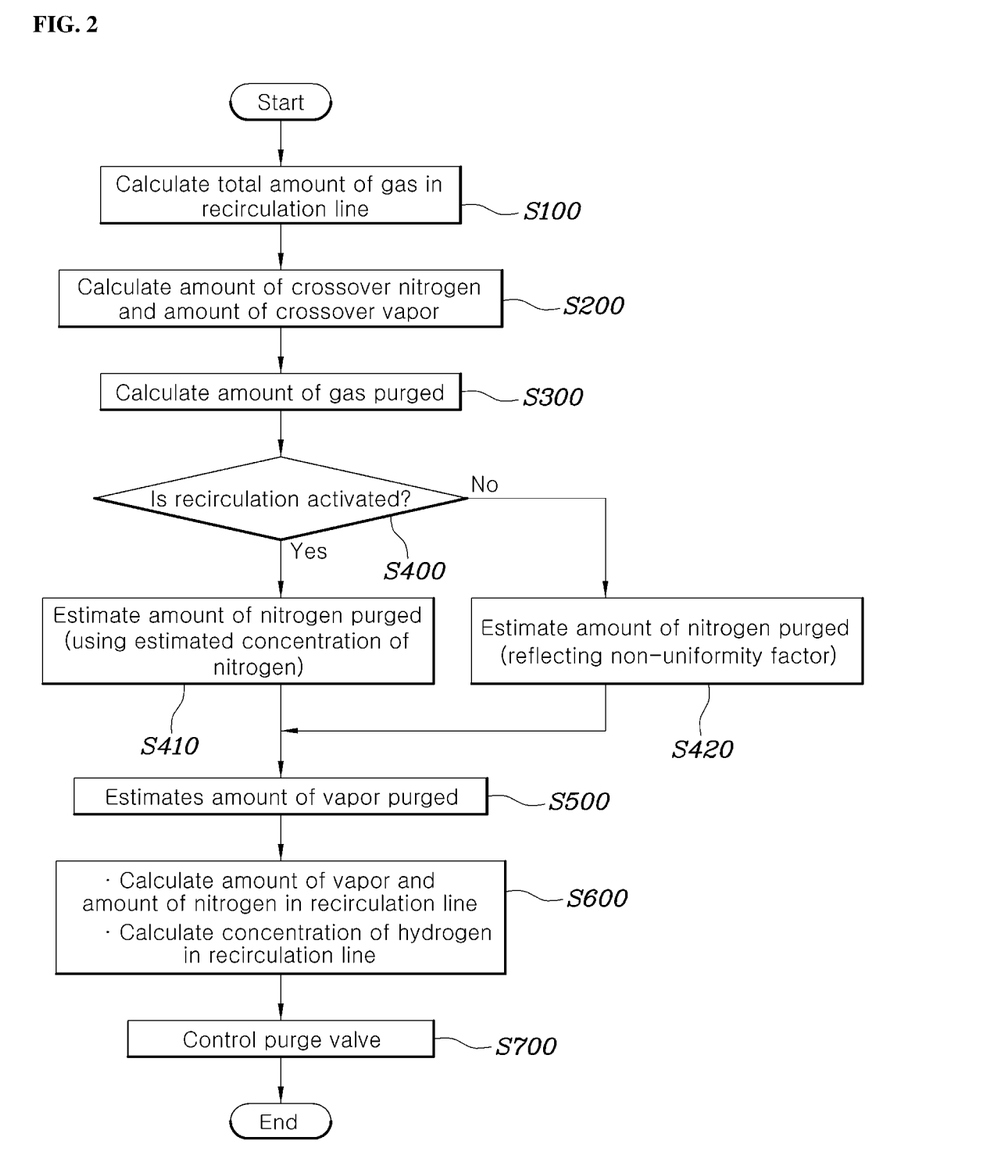
FIG. 2 is a flowchart of the method of controlling a hydrogen supply control method for a fuel cell according to an exemplary embodiment of the invention.

FIG. 2 is a flowchart of the method of controlling a hydrogen supply control method for a fuel cell according to an exemplary embodiment of the invention. Referring back to FIG. 2, a hydrogen supply control method for a fuel cell according to an exemplary embodiment of the present invention may include: determining a recirculation state of a recirculation line 20, which supplies hydrogen discharged from an outlet of a fuel cell stack 10 back to an inlet of the fuel cell stack 10 (S400); estimating a purge amount for each gas, which is purged by a purge valve 40 connected to the outside from the recirculation line 20, based on the determined recirculation state of the recirculation line 20 (S410, S420, and S500); and estimating a concentration of hydrogen in the recirculation line 20 based on the estimated purge amount for each gas (S600).

Specifically, at the determining of the recirculation state of the recirculation line 20 (S400), it may be possible to determine a recirculation state based on an output current of the fuel cell stack 10. The output current of the fuel cell stack 10 is proportional to the amount of hydrogen consumed in the fuel cell stack 10. The amount of hydrogen consumed in the fuel cell stack 10 may be the sum of the amount of hydrogen generated and the amount of hydrogen crossover. In particular, the amount of hydrogen generated is directly proportional to the output current of the fuel cell stack 10.

As the amount of hydrogen consumed increases, the amount of hydrogen supplied from the fuel tank through the ejector 30 increases. As a result, the differential pressure between the inlet side and the outlet side of the fuel cell stack 10 increases whereby the flowing amount of the recirculation line 20 increases. In other words, the recirculation state of the recirculation line 20 may be determined to be activated as the output current of the fuel cell stack 10 increases. More specifically, at the determining of the recirculation state of the recirculation line 20 (S400), the recirculation state may be determined to be activated when a state in which the output current of the fuel cell stack 10 is equal to or greater than a predetermined first current continues for a predetermined time or longer.

At the determining of the recirculation state of the recirculation line 20 (S400), a recirculation state may be determined to be inactivated when a state in which the output current of the fuel cell stack 10 is equal to or less than a predetermined second current continues for a predetermined time or longer. The predetermined time reflects a delay effect depending on inertia of gas. Even when the amount of hydrogen consumed instantaneously increases, a time delay occurs in reflecting the recirculation effect of the recirculation line 20 in accordance with the supply of hydrogen through the ejector 30. The predetermined time may be a delay time measured by an experiment, and may be, for example, about three seconds.

The first current may be set such an extent that the output current of the fuel cell stack 10 is sufficiently large such that the amount of hydrogen consumed in the fuel cell stack 10 is increased substantially. Conversely, the second current may be set to a state in which the output current of the fuel cell stack 10 is small such that the amount of hydrogen consumed in the fuel cell stack 10 is small.

For example, the first current may be set 5 [A], and the second current may be set 3 [A]. The first current and the second current may be set in consideration of the size of the fuel cell stack 10.

At the estimating of a purge amount for each gas (S410, S420, and S500), the concentration of nitrogen or hydrogen, which is estimated based on the assumption that the gases in the recirculation line 20 are distributed uniformly, may be corrected according to the recirculation state of the recirculation line 20. Then, a purge amount of nitrogen or a purge amount of hydrogen may be estimated using the corrected concentration of nitrogen or hydrogen.

A concentration of nitrogen or hydrogen may be estimated assuming that gas in the recirculation line 20 is distributed uniformly. Specifically, a concentration of nitrogen or hydrogen may be estimated using the total gas amount in the recirculation line 20, the amount of crossover nitrogen introduced, the amount of crossover vapor introduced, and the estimated purge amount for each gas.

The total amount $n_{An}$ of gas in the recirculation line 20 may be estimated from the ideal gas law using gas pressure P, volume V, and temperature T of the recirculation line 20 as expressed by the following equation.

$$n_{An} = \frac{P_{An} V_{An}}{RT} [\text{mol}]$$

wherein R is the gas constant, 8.314 [J/mol·K].

A rate of gas diffusion may be in inverse proportion to a thickness of an electrolyte membrane of the fuel cell stack 10 and may be proportional to a difference in gas partial pressures between the anode side and the cathode side. Specifically, the amount of crossover gas is calculated by applying the following Fick's law of diffusion.

$$\frac{\dot{m}}{A} = -D \frac{\partial c}{\partial x} = -D \frac{M}{RT} \frac{\partial P}{\partial x}$$

wherein $\dot{m}$ is the mass rate of gas diffusion, A is the diffusion area, D is the diffusion coefficient of gas, x is the diffusion length, c is the concentration of gas, R is the gas constant (8.314 J/mol·K), P is the pressure of gas, T is the temperature of gas, and M is the molar mass of gas [g/mol]. This will be summarized as follows.

$$\dot{m} = -\frac{M}{RT} \frac{\partial P}{\partial x} A = \dot{n} \cdot M$$

-continued $$\dot{n} = -D\frac{1}{RT}\frac{\partial P}{\partial x}A$$

wherein $\dot{n}$ is the rate of gas diffusion [mol/s].

In other words, the amount of gas crossovered between the electrolyte membranes of the fuel cell stack 10 may be calculated by the following equation.

$$n_{N2\_xo} = \frac{D_{N2}}{RT}\frac{P_{Ca,N2} - P_{An,N2}}{\delta}A$$

wherein $n_{N2\_xo}$ is the diffusion rate of nitrogen, P is the pressure [kPa], R is the gas constant (8.314 J/mol·K), T is the temperature [K], D is the diffusion coefficient, A is the area of the electrolyte membrane, δ is the thickness of the electrolyte membrane, $P_{Ca,N2}$ is the nitrogen partial pressure of the cathode side of the fuel cell, and $P_{An,N2}$ is the nitrogen partial pressure of the anode side of the fuel cell.

$$n_{V\_xo} = \frac{D_V}{RT}\frac{P_{Ca,V} - P_{An,V}}{\delta}A$$

wherein $\dot{n}_{V\_xo}$ is the diffusion rate of the vapor, P is the pressure [kPa], R is the gas constant (8.314 J/mol·K), T is the temperature [K], D is the diffusion coefficient, A is the area of the electrolyte membrane, δ is the thickness of the electrolyte membrane, $P_{Ca,V}$ is the vapor partial pressure of the cathode side of the fuel cell, and $P_{An,V}$ is the vapor partial pressure of the anode side of the fuel cell.

Hydrogen may crossover from the anode side to the cathode side of the fuel cell, contrary to nitrogen and vapor.

$$n_{H2\_xo} = \frac{D_{H2}}{RT}\frac{P_{An,H2} - P_{Ca,H2}}{\delta}A$$

wherein $n_{H2\_xo}$ is the diffusion rate of hydrogen, P is the pressure [kPa], R is the gas constant (8.314 J/mol·K), T is the temperature [K], D is the diffusion coefficient, A is the area of the electrolyte membrane, δ is the thickness of the electrolyte membrane, $P_{An,H2}$ is the hydrogen partial pressure of the anode side of the fuel cell, $P_{Ca,H2}$ is the hydrogen partial pressure of the cathode side of the fuel cell.

In addition, the rate of gas diffusion is proportional to the gas diffusion coefficient, and the gas diffusion coefficient may vary depending on water content and temperature of the electrolyte membrane disposed between the anode side and the cathode side of the fuel cell.

Although the gas diffusion coefficient D may be a fixed constant value, the gas diffusion coefficient D may vary depending on a state of the fuel cell, such as the degree of deterioration and the temperature of the fuel cell, to increase the accuracy of the calculation. More specifically, the gas diffusion coefficient D may be calculated using a value that varies depending on water content and temperature of the electrolyte membrane disposed between the anode side and the cathode side of the fuel cell. Further, the gas diffusion coefficient D may be calculated to vary as the electrolyte membrane of the fuel cell stack 10 is deteriorated.

A purge rate ($n_{purge}$) of gas may be proportional to the difference between the gas pressure ($P_{An}$) on the anode side and the gas pressure ($P_{out}$) on the outside thereof. The gas pressure ($P_{out}$) on the outside may be the gas pressure on the cathode side. The detailed equation may be as follows.

$$n_{purge} = C(P_{An} - P_{out})$$

wherein C is the purge gain value, which may be a value determined by a purge period, an opened degree of the purge valve 40 during purge, and an opened time of the purge valve.

Specifically, the purge rate for each gas may be calculated by the following equation (purge rate for nitrogen ($n_{N2\_purge}$), purge rate for vapor ($n_{V\_purge}$), and purge rate for hydrogen ($n_{H2\_purge}$)).

$$n_{N2\_purge} = n_{purge} \cdot \frac{n_{N2}}{n_{An}}$$

$$n_{V\_purge} = n_{purge} \cdot \frac{n_V}{n_{An}}$$

$$n_{H2\_purge} = n_{purge} \cdot \frac{n_{H2}}{n_{An}}$$

Initial amounts of nitrogen and vapor in the recirculation line 20 may each be estimated. The amounts of crossover nitrogen and crossover vapor on the anode side and the purge amounts of nitrogen and vapor may be calculated, respectively. The present amount of nitrogen in the recirculation line 20 may be calculated based on the amount of crossover nitrogen and the purge amount of nitrogen. Accordingly, the present amount of vapor in the recirculation line 20 may be calculated based on the predicted initial amount of vapor, the amount of crossover vapor, and the purge amount of vapor.

In other words, the present amounts of nitrogen and vapor may be calculated by integrating the diffusion rate and the purge rate per unit time and summing with the initial amounts using the above equations. The present amount of hydrogen may be calculated by subtracting the present amounts of nitrogen and vapor from the gas amount in the recirculation line 20. Therefore, assuming that the gases are distributed uniformly in the recirculation line 20, the concentration of nitrogen and the concentration of hydrogen may each be estimated by calculating the gas amount in the recirculation line 20, and the present amounts of nitrogen, vapor, and hydrogen.

Specifically, it may be possible to correct the estimated concentration of nitrogen and the estimated concentration of hydrogen based on the recirculation state of the recirculation line 20 and estimate a purge amount of nitrogen and a purge amount of hydrogen using the corrected concentration of nitrogen or hydrogen. When the gases in the recirculation line 20 are distributed uniformly, the purge amount for each gas may be estimated as follows.

Purge amount of hydrogen=(Total purge amount)*
(Amount of hydrogen/Amount of gas in recirculation line 20)

Purge amount of nitrogen=(Total purge amount)*
(Amount of nitrogen/Amount of gas in recirculation line 20)

Purge amount of vapor=(Total purge amount)*
(Amount of vapor/Amount of gas in recirculation line 20)

However, when the recirculation state is inactivated, it may be impossible to assume that the gases in the recirculation line 20 are distributed uniformly. Therefore, it may be possible to correct the concentration of nitrogen or hydrogen in the recirculation line 20 by reflecting a non-uniformity factor. The non-uniformity factor may be a positive number of a predetermined fixed value, or may be multiple variable values depending on the level of inactivation of the recirculation.

Specifically, in a manner that reflects a non-uniformity factor, which is predetermined according to the recirculation state, as following the equation below, it may be possible to correct the concentration of nitrogen estimated assuming that the gases in the recirculation line 20 are distributed uniformly to be lowered. Conversely, it may be possible to correct the concentration of hydrogen estimated assuming that the gases in the recirculation line 20 are distributed uniformly to be increased.

Purge amount of hydrogen=(1+Non-uniformity factor)*(Total purge amount)*(Amount of hydrogen/Amount of gas in recirculation line 20)

Purge amount of nitrogen=(1+Non-uniformity factor) *(Total purge amount)*(Amount of nitrogen/ Amount of gas in recirculation line 20)

Purge amount of vapor=(Total purge amount)* (Amount of vapor/Amount of gas in recirculation line 20)

When the recirculation of the recirculation line 20 is inactivated, the concentration of nitrogen purged by the purge valve 40 is reduced due to effects that the crossover nitrogen is not diffused from the fuel cell stack 10 side and is not moved by inertia. Conversely, the concentration of hydrogen is greater than the assumed concentration of hydrogen. However, it may be assumed that there is no difference in the concentration of the vapor.

On the contrary, at the estimating of a purge amount for each gas (S410, S420, and S500), in response to determining that the recirculation state is activated, it may be possible to estimate the purge amount for each gas using the estimated gas concentration as it is. In other words, in response to determining that the recirculation is activated, the gases in the recirculation line 20 may be assumed to be distributed uniformly. Therefore, it may be possible to substitute that the non-uniformity factor is zero.

At the estimating of a concentration of hydrogen in the recirculation line 20 (S600), a concentration of hydrogen may be estimated based on the total gas amount in the recirculation line 20, the amount of crossover nitrogen introduced, the amount of crossover vapor introduced, and the estimated purge amount for each gas. When estimating the total gas amount in the recirculation line 20, the amount of crossover nitrogen introduced, and the amount of crossover vapor introduced as described above, the non-uniform factor may be considered to estimate the purge amount for each gas to thus estimate a purge amount of nitrogen or a purge amount of hydrogen.

Specifically, a method of estimating a concentration of hydrogen in the recirculation line 20 may include measuring pressure of the recirculation line 20 using a pressure sensor and calculating the total amount of gas in the recirculation line 20 using the ideal gas law (S100). In addition, as described above, the amount of crossover nitrogen and the amount of crossover vapor may be calculated using the diffusion equation (S200).

Further, the amount of gas purged by the difference in pressure between the recirculation line 20 and the outside may be calculated (S300), wherein the purge valve 40 is interposed therebetween. Based on the recirculation state, the amount of nitrogen and the amount of vapor may each be estimated from the amount of gas purged (S410, S420, and S500). When the recirculation state is activated, the estimated concentration of nitrogen may be used as it is (S410). When the recirculation state is inactivated, the amount of nitrogen purged may reflect the non-uniformity factor (S420).

The amount of vapor and the amount of nitrogen in the recirculation line 20 may be estimated by summing the initial amount of vapor and the initial amount of nitrogen in the recirculation line 20 with the crossover amount and the purge amount (obtained by integrating the diffusion rate and the purge rate with respect to time), and accordingly, the amount of hydrogen and the concentration of hydrogen may be estimated (S600). After the estimating of a concentration of hydrogen in the recirculation line 20 (S600), the method may further include adjusting an opening degree of the purge valve 40 based on the estimated concentration of hydrogen (S700).

Furthermore, to maintain the concentration of hydrogen in recirculation line 20 within a predetermined range, the purge valve 40 may be maintained in an open state for a predetermined time or maintained opened until the concentration of hydrogen reaches a predetermined upper limit value when the concentration of hydrogen is at a predetermined lower limit value. Accordingly, it may be possible to estimate the concentration of hydrogen with improved accuracy, thereby preventing performing of unnecessary purging. In addition, it may be possible to appropriately control performing of purging to maintain the concentration of hydrogen at a predetermined concentration or greater, thereby improving the fuel efficiency and improving the durability of the fuel cell stack 10.

Although the specific exemplary embodiments of the present invention have been described with reference to the accompanying drawings, those skilled in the art will appreciate that various modifications, additions and substitutions are possible, without departing from the scope and spirit of the invention.

What is claimed is:

1. A hydrogen supply control system for a fuel cell, comprising:
    a fuel cell stack that generates electricity using supplied hydrogen and air;
    a recirculation line comprising a gas comprising at least hydrogen and nitrogen that supplies hydrogen discharged from an outlet of the fuel cell stack back to an inlet of the fuel cell stack;
    a purge valve disposed at an outlet side of the fuel cell stack of the recirculation line and that discharges hydrogen in the recirculation line to the outside as the outlet is opened;
    a recirculation determining processor configured to determine a recirculation state of the recirculation line; and
    a concentration estimator configured to estimate a purge amount for each gas, which is purged by the purge valve connected to the outside from the recirculation line, based on the recirculation state of the recirculation line determined by the recirculation determining processor and estimate a concentration of hydrogen in the recirculation line based on the estimated purge amount for each gas;
    a purge controller configured to adjust an open degree of the purge valve based on the estimated concentration of hydrogen;
    wherein the concentration estimator is configured to correct the concentration of nitrogen or hydrogen, estimated based on the assumption that the gases in the recirculation line are distributed uniformly, according to the recirculation state of the recirculation line and estimate a purge amount of nitrogen or a purge amount of hydrogen using the corrected concentration of nitrogen or hydrogen.

2. The system of claim 1, further comprising:
an ejector disposed at the inlet side of the fuel cell stack of the recirculation line and connected to the fuel tank to supply hydrogen in a fuel tank to the recirculation line.

3. The system of claim 1, wherein the recirculation determining processor is configured to determine a recirculation state based on an output current of the fuel cell stack.

4. A hydrogen supply control method for a fuel cell, comprising:
determining, by a controller, a recirculation state of a recirculation line, which supplies hydrogen discharged from an outlet of a fuel cell stack back to an inlet of the fuel cell stack, wherein the recirculation line comprises a gas comprising at least hydrogen and nitrogen;
estimating, by the controller, a purge amount for each gas, which is purged by a purge valve connected to the outside from the recirculation line, based on the determined recirculation state of the recirculation line;
estimating, by the controller, a concentration of hydrogen in the recirculation line based on the estimated purge amount for each gas; and
adjusting, by the controller, an opening degree of the purge valve based on the estimated concentration of hydrogen after estimating the concentration of the hydrogen in the recirculation line,
wherein, at the estimating of a purge amount for each gas, the concentration of nitrogen or hydrogen, which is estimated based on the assumption that the gases in the recirculation line are distributed uniformly, is corrected according to the recirculation state of the recirculation line, and a purge amount of nitrogen or a purge amount of hydrogen is estimated using the corrected concentration of nitrogen or hydrogen.

5. The method of claim 4, wherein, at the determining of the recirculation state of the recirculation line, the recirculation state is determined based on an output current of the fuel cell stack.

6. The method of claim 5, wherein, at the determining of the recirculation state of the recirculation line, the recirculation state is determined to be activated when a state in which the output current of the fuel cell stack is equal to or greater than a predetermined first current continues for a predetermined time or longer.

7. The method of claim 5, wherein, at the determining of the recirculation state of the recirculation line, the recirculation state is determined to be inactivated when a state in which the output current of the fuel cell stack is equal to or less than a predetermined second current continues for a predetermined time or longer.

8. The method of claim 4, wherein, at the estimating of a purge amount for each gas, the concentration of nitrogen estimated assuming that the gases in the recirculation line are distributed uniformly is corrected to be decreased or to be increased by reflecting a non-uniformity factor, which is predetermined according to the recirculation state.

9. The method of claim 4, wherein, at the estimating of a purge amount for each gas, when the recirculation state is determined to be activated, the purge amount for each gas is estimated using the estimated gas concentration as it is, the gas concentration being estimated assuming that the gases in the recirculation line are distributed uniformly.

10. The method of claim 4, wherein, at the estimating of a concentration of hydrogen in the recirculation line, the concentration of hydrogen is estimated based on the total gas amount in the recirculation line, the amount of crossover nitrogen introduced, the amount of crossover vapor introduced, and the estimated purge amount for each gas.

* * * * *